(12) United States Patent
Gerardo Castro et al.

(10) Patent No.: US 10,195,992 B2
(45) Date of Patent: Feb. 5, 2019

(54) OBSTACLE DETECTION SYSTEMS AND METHODS

(71) Applicant: Ford Global Technologies, LLC, Dearborn, MI (US)

(72) Inventors: Marcos Paul Gerardo Castro, Mountain View, CA (US); Dongran Liu, San Jose, CA (US); Sneha Kadetotad, Cupertino, CA (US); Jinesh J Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/478,118

(22) Filed: Apr. 3, 2017

(65) Prior Publication Data

US 2018/0281680 A1 Oct. 4, 2018

(51) Int. Cl.
*B60R 1/00* (2006.01)
*G06F 17/11* (2006.01)
*G06N 7/00* (2006.01)
*G01S 13/93* (2006.01)
*G01S 17/93* (2006.01)

(52) U.S. Cl.
CPC ............... *B60R 1/00* (2013.01); *G06F 17/11* (2013.01); *G06N 7/005* (2013.01); *B60R 2300/802* (2013.01); *B60R 2300/8093* (2013.01); *G01S 13/931* (2013.01); *G01S 17/936* (2013.01); *G01S 2013/9317* (2013.01)

(58) Field of Classification Search
CPC ............... B60R 1/00; B60R 2300/802; B60R 2300/8093; G06F 17/11; G06N 7/005; G01S 13/931; G01S 17/936; G01S 2013/9317
See application file for complete search history.

(56) References Cited

U.S. PATENT DOCUMENTS

| 6,163,252 | A | 12/2000 | Nishiwak | |
| 8,744,744 | B2 | 6/2014 | Takagi | |
| 9,465,388 | B1* | 10/2016 | Fairfield | G05D 1/0044 |
| 2006/0293856 | A1 | 12/2006 | Foessel | |
| 2012/0053755 | A1 | 3/2012 | Takagi | |
| 2014/0136414 | A1* | 5/2014 | Abhyanker | G06Q 50/28 705/44 |
| 2014/0314275 | A1* | 10/2014 | Edmondson | G06K 9/00771 382/103 |

(Continued)

FOREIGN PATENT DOCUMENTS

DE 102007013023 9/2008
DE 102008036009 A1 10/2009
(Continued)

*Primary Examiner* — Hussein Elchanti
(74) *Attorney, Agent, or Firm* — David R. Stevens; Stevens Law Group

(57) ABSTRACT

Example obstacle detection systems and methods are described. In one implementation, a method receives data from at least one sensor mounted to a vehicle and creates a probabilistic grid-based map associated with an area near the vehicle. The method also determines a confidence associated with each probability in the grid-based map and determines a likelihood that an obstacle exists in the area near the vehicle based on the probabilistic grid-based map.

8 Claims, 4 Drawing Sheets

(56) References Cited

U.S. PATENT DOCUMENTS

| | | | | |
|---|---|---|---|---|
| 2015/0149088 A1* | 5/2015 | Attard | ............... | G01C 21/36 |
| | | | | 701/538 |
| 2017/0124476 A1* | 5/2017 | Levinson | ............ | G05D 1/0088 |
| 2017/0247036 A1* | 8/2017 | Halder | ............... | B60W 40/02 |
| 2017/0256071 A1 | 9/2017 | Laugier | | |
| 2017/0369051 A1* | 12/2017 | Sakai | ............... | B60W 30/09 |
| 2018/0033310 A1* | 2/2018 | Kentley-Klay | ....... | G06Q 10/02 |

FOREIGN PATENT DOCUMENTS

| | | |
|---|---|---|
| DE | 102013018315 A1 | 4/2015 |
| DE | 102015213558 | 1/2017 |
| FR | 2890773 A1 | 3/2007 |
| WO | WO-2005081200 A2 | 9/2005 |
| WO | WO-2016150728 A1 | 9/2016 |

* cited by examiner

OBSTACLE DETECTION SYSTEMS AND METHODS

TECHNICAL FIELD

The present disclosure relates to vehicular systems and, more particularly, to systems and methods that detect obstacles located near a vehicle.

BACKGROUND

Automobiles and other vehicles provide a significant portion of transportation for commercial, government, and private entities. Vehicles, such as autonomous vehicles, drive on roadways, parking lots, and other areas that may contain any number of obstacles. In certain driving situations, such as when a vehicle is backing up, the visibility of the driver or autonomous driving system may be limited. This limited visibility puts the vehicle at risk of colliding with obstacles in the path of the vehicle. The accurate detection of obstacles near a vehicle gives the vehicle driver, or the autonomous driving system, an opportunity to make driving changes and avoid colliding with the obstacle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
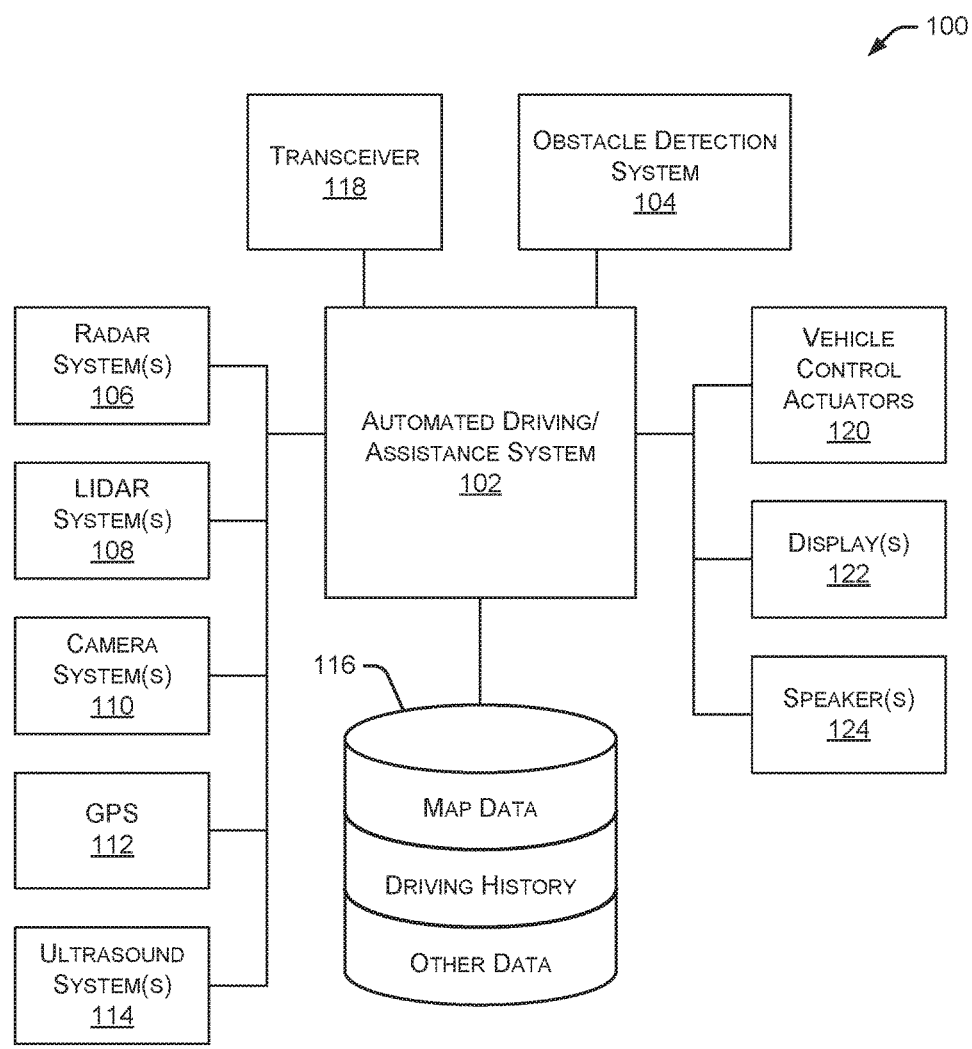
FIG. 1 is a block diagram illustrating an embodiment of a vehicle control system that includes an obstacle detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes an obstacle detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes obstacle detection system 104 that interacts with various components in the vehicle control system to detect and respond to potential (or likely) obstacles located near the vehicle (e.g., in the path of the vehicle). In one embodiment, obstacle detection system 104 detects an obstacle behind the vehicle when the vehicle is backing up and adjusts one or more vehicle operations to avoid contact with the obstacle, such as stopping the vehicle or maneuvering the vehicle around the obstacle. Although obstacle detection system 104 is shown as a separate component in FIG. 1, in alternate embodiments, obstacle detection system 104 may be incorporated into automated driving/assistance system 102 or any other vehicle component.

The vehicle control system 100 also includes one or more sensor systems/devices for detecting a presence of nearby objects (or obstacles) or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that the automated driving/assistance system 102 can assist a driver or drive a vehicle in real-time.

Figure 2:
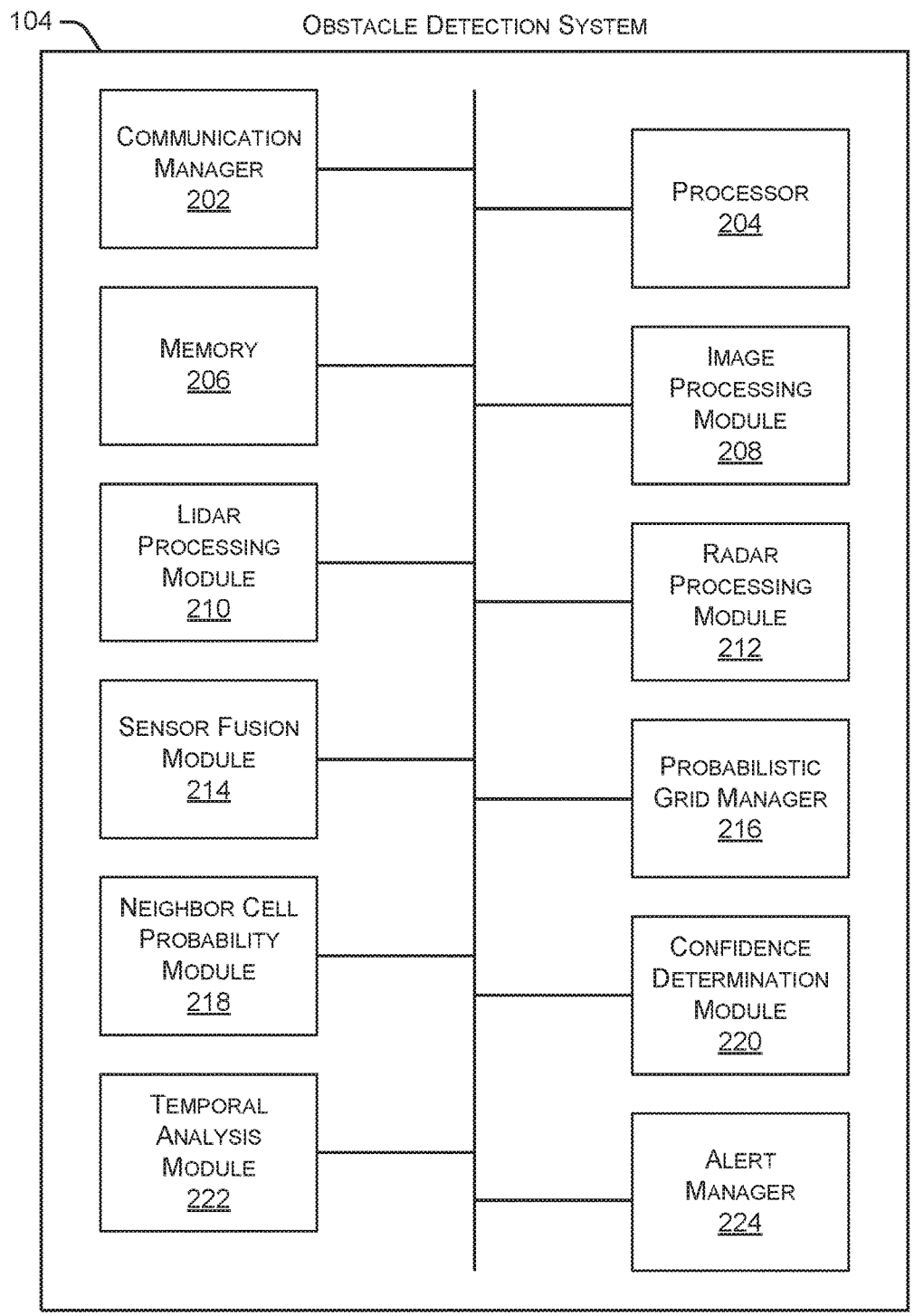
FIG. 2 is a block diagram illustrating an embodiment of an obstacle detection system.

FIG. 2 is a block diagram illustrating an embodiment of obstacle detection system 104. As shown in FIG. 2, obstacle detection system 104 includes a communication manager 202, a processor 204, and a memory 206. Communication manager 202 allows obstacle detection system 104 to communicate with other systems, such as automated driving/assistance system 102. Processor 204 executes various instructions to implement the functionality provided by obstacle detection system 104 as discussed herein. Memory 206 stores these instructions as well as other data used by processor 204 and other modules and components contained in obstacle detection system 104.

Additionally, obstacle detection system 104 includes an image processing module 208 that receives image data from one or more camera systems 110 and identifies, for example, obstacles near the parent vehicle (i.e., the vehicle containing obstacle detection system 104). In some embodiments, image processing module 208 includes an obstacle detection algorithm that identifies a potential obstacle located near the parent vehicle. For example, the obstacle detection algorithm may identify a distance between the parent vehicle and the obstacle as well as the trajectory of the obstacle if it is moving. Based on the distance and trajectory of the obstacle, the obstacle detection algorithm can determine the likelihood of a collision between the parent vehicle and the obstacle.

A LIDAR processing module 210 receives LIDAR data from one or more LIDAR systems 108 and identifies, for example, a potential collision with an obstacle near the parent vehicle. In some embodiments, the obstacle detection algorithm detects obstacles near the vehicle based on LIDAR data. Additionally, a radar processing module 212 receives radar data from one or more radar systems 106 to identify, for example, a potential collision with an obstacle. In some embodiments, the obstacle detection algorithm uses the radar data to detect one or more obstacles near the vehicle.

Obstacle detection system 104 also includes a sensor fusion module 214 that fuses data from multiple sensors, cameras, and data sources, as discussed herein. For example, sensor fusion module 214 may fuse data from one or more cameras 110, radar systems 106, and LIDAR systems 108 to detect an obstacle and determine possible actions that can avoid or mitigate a collision with the obstacle. A probabilistic grid manager 216 performs various operations related to creating and maintaining a probabilistic grid-based map based on data received from any number of vehicle sensors and/or data sources, as discussed herein.

Additionally, obstacle detection system 104 includes a neighbor cell probability module 218 that calculates probabilities associated with neighboring cells in a probabilistic grid-based map, as discussed herein. A confidence determination module 220 determines a confidence associated with each cell in the probabilistic grid-based map using, for example, the systems and methods discussed herein.

Obstacle detection system 104 also includes a temporal analysis module 222 that performs temporal analysis of data received from one or more sensors. In some embodiments, temporal analysis module 222 applies learning and forgetting factors associated with the probabilistic grid-based map. An alert manager 224 manages the generation and communication of alerts to an occupant (e.g., driver) of the vehicle or to automated driving/assistance system 102. For example, the alert may be associated with an obstacle in the path of the vehicle that represents a collision risk.

Figure 3A:
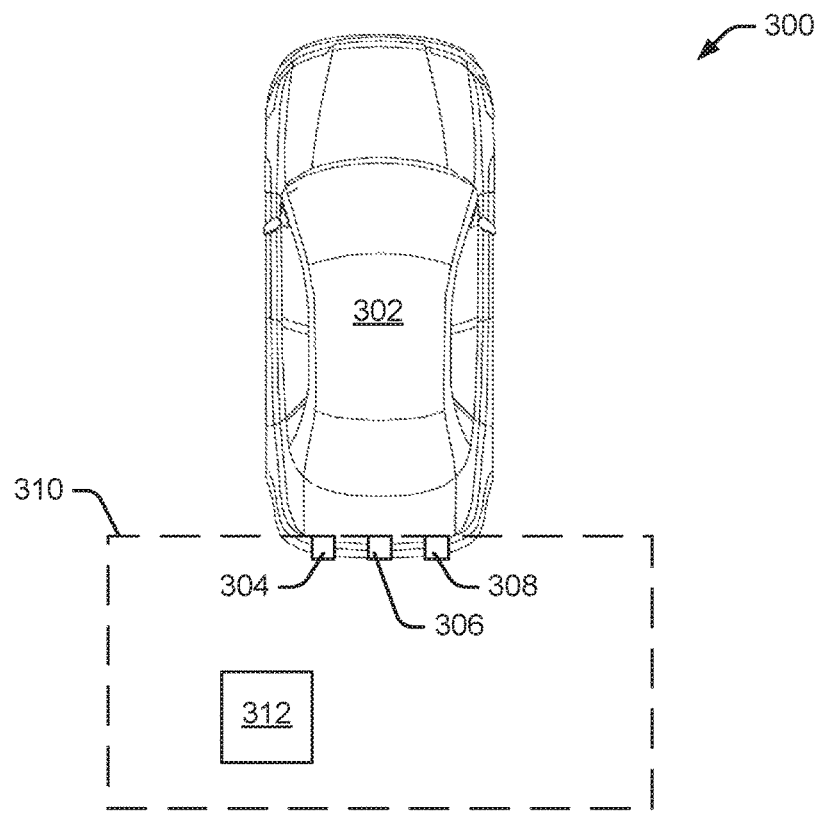
FIG. 3A illustrates an embodiment of a vehicle with a zone of interest behind the vehicle.

FIG. 3A illustrates an embodiment of a vehicle 302 with a zone of interest 310 located behind the vehicle. Vehicle 302 includes any number of sensors, such as the various types of sensors discussed herein. In the particular example of FIG. 3A, vehicle 302 includes a Lidar sensor 304, a rear-facing camera 306, and a radar sensor 308. Vehicle 302 may have any number of additional sensors (not shown) mounted in multiple vehicle locations. In this example, zone of interest 310 is located behind vehicle 302 because vehicle 302 is backing up or getting ready to back up. The area behind vehicle 302 is important because that's the area that vehicle 302 is driving into. Thus, it is important to identify any obstacles in zone of interest 310 that might collide with vehicle 302.

As shown in FIG. 3A, an obstacle 312 is present within zone of interest 310. Obstacle 312 may be a person, animal, another vehicle, a structural item (e.g., a building or a light post), an object, and the like. Obstacle 312 may be stationary or moving within zone of interest 310. If obstacle 312 is moving, obstacle detection system 104 determines a speed and trajectory of the movement to predict the location of obstacle 312 at a future time (e.g., when the obstacle's trajectory intersects the vehicle's path of movement). As discussed herein, if obstacle detection system 104 detects a potential collision, it may instruct the driver or automated driving system to take action to avoid the collision. This action may include, for example, stopping vehicle 302, slowing vehicle 302, or changing the steering direction of vehicle 302.

Figure 3B:
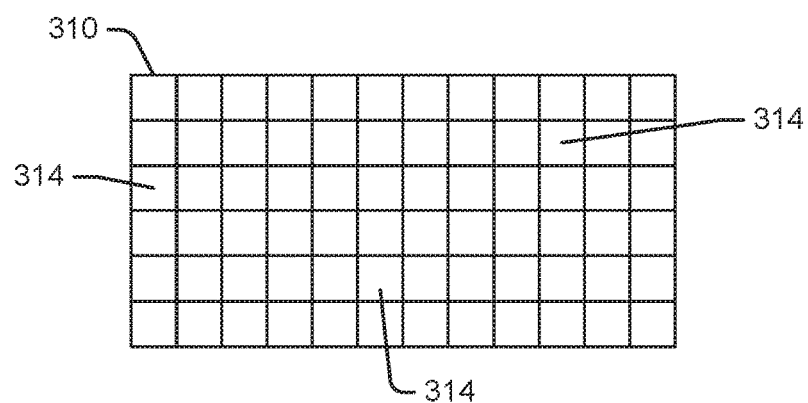
FIG. 3B illustrates an example zone of interest behind a vehicle.

FIG. 3B illustrates a grid structure of the example zone of interest 310 located behind vehicle 302. Zone of interest 310 includes a two-dimensional grid (or two-dimensional array) with multiple grid cells 314. A particular grid structure may include any number of grid cells based on, for example, computation capabilities, sensor resolution, and application of the data associated with the grid structure. In particular implementations operating with range sensor data, the grid size may vary between 0.1-0.5 meters. In other implementations, any other grid size may be used. The systems and methods discussed herein associate a probability with each cell 314 in the two-dimensional grid, where each probability represents a likelihood that an obstacle is located within the particular cell 314. Additional details regarding the calculating and managing of these probabilities are discussed below.

Figure 4:
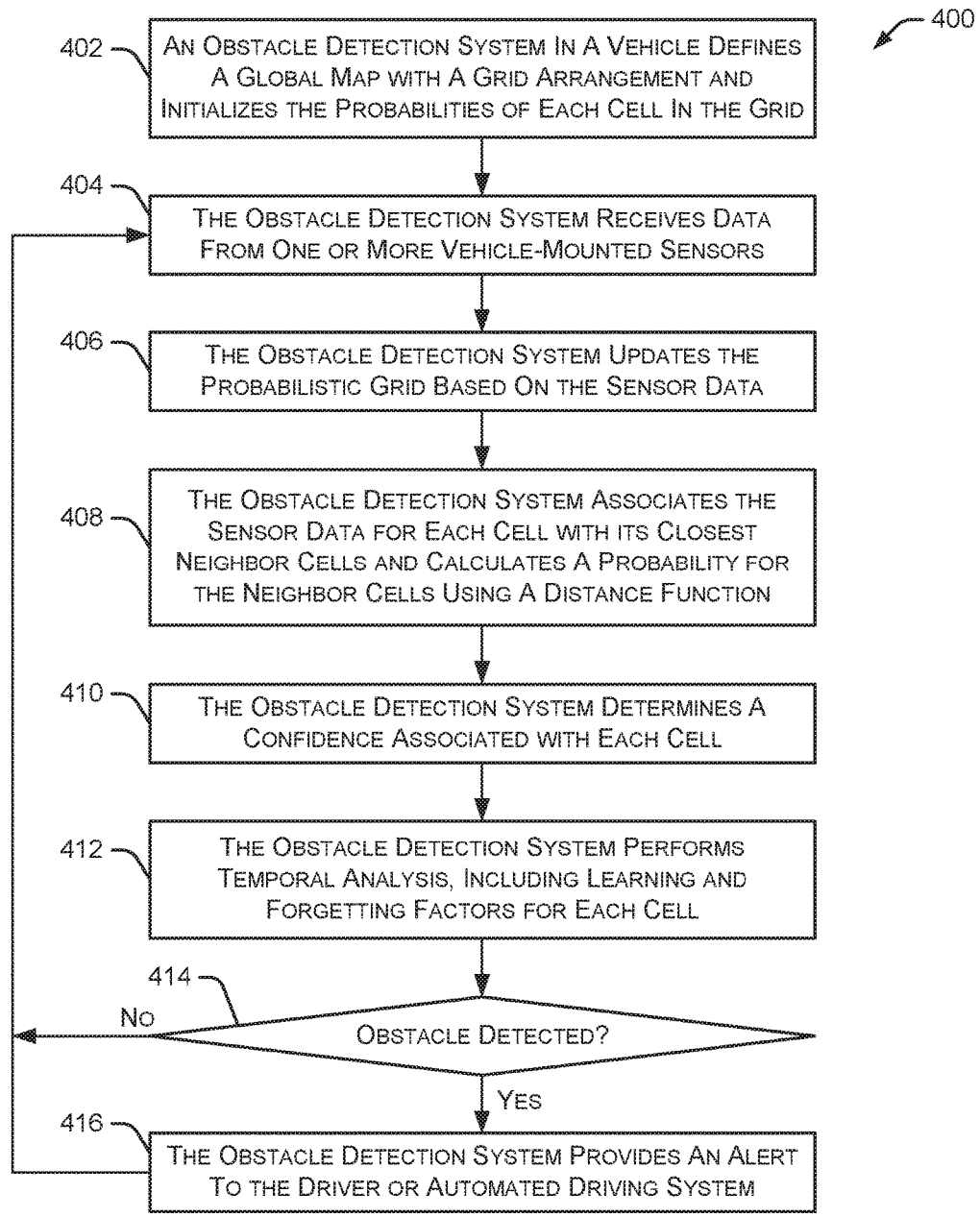
FIG. 4 illustrates an embodiment of a method for detecting an obstacle near a vehicle.

FIG. 4 illustrates an embodiment of a method 400 for detecting an obstacle near a vehicle. Initially, an obstacle detection system in a vehicle defines 402 a global map having a two-dimensional grid arrangement. Each cell in the grid is initialized by associating an initial probability with each cell. The probability associated with each cell indicates the likelihood that an obstacle is present in that grid of the map. In some embodiments, the initial probability value associated with each cell is set to 0.5. This indicates that each cell is equally likely to be occupied or empty. Once an obstacle is detected in each cell, this initial probability is increased. Similarly, if no object is detected, the initial probability is decreased. As used herein, the global map with the grid arrangement is also referred to as a "probabilistic grid-based map." As discussed with respect to FIGS. 3A and 3B, the probabilistic grid-based map is associated with zone of interest 310.

Method 400 continues as the obstacle detection system receives 404 data from one or more vehicle-mounted sensors, such as cameras, Lidar sensors, Radar sensors, ultrasound sensors, and the like. Based on the data received from the vehicle-mounted sensors, the obstacle detection system updates 406 the probabilistic grid-based map associated with zone of interest 310. Additionally, the updating of the probabilistic grid-based map may consider data associated with the vehicle's dynamics, such as vehicle speed, vehicle orientation, vehicle pose, vehicle dimensions, vehicle shape, vehicle acceleration, steering wheel orientation, and the like. In some embodiments, the obstacle detection system uses Bayesian probabilistic theory to determine the probability values in the probabilistic grid-based map. In some implementations, data from the vehicle sensors is used at different levels of information to detect obstacles in the zone of interest. For example, the different levels of information include raw sensor data, object level data, and the like. Data received from range sensors (directly or indirectly) can be distance-based data or Time-To-Collision (TTC) based data.

In some embodiments, occupancy grid mapping procedures update a map according to a sensor reading at a location so that as more data accumulates, the map becomes correct. Particular methods of occupancy grid mapping include the recursive Bayes filter, Monte Carlo Localization (using models from a single sensor or multiple sensors), Partially Observable Markov Decision Process, Particle Filters, and the like.

The obstacle detection system then associates 408 the sensor data for each cell with its closest neighbor cells and calculates a probability for the neighbor cells using a distance function. In some embodiments, the obstacle detection system considers the probabilities of the eight neighboring cells surrounding a particular cell when calculating the probability of the particular cell. In some embodiments, the obstacle detection system updates the probability of a window of cells located in the neighborhood of a particular cell. For example, the update process may determine the location and properties of a particular cell in the probabilistic grid-based map. The update process also determines a particular neighborhood size, which indicates a number of nearest neighbors to be updated. A maximum probability value identifies the maximum probability that can be assigned to the nearest neighbors. The update process first identifies the nearest neighbor locations of the particular cell. Then, a cost function is used to assign weights to each of the neighbors. For example, the cost function may be designed to depend on the distances from the nearest neighbors to the particular cell. Finally, based on the weights and the position of the nearest neighbors, the probabilities of the nearest neighbors are updated using a Bayesian approach or similar method.

Method 400 continues as the obstacle detection system determines 410 a confidence (e.g., confidence level) associated with each cell in the probabilistic grid-based map. In some embodiments, the confidence of each cell in the probabilistic grid-based map is inferred using the variance from the model. For example, the probability that a cell is occupied (i.e., has detected an obstacle) can be computed using a probabilistic approach model. From this probabilistic approach, the system can infer a variance based on the density of a Gaussian or based on the spread of the data.

The obstacle detection system performs 412 a temporal analysis of the data received from the vehicle-mounted sensors. The temporal analysis includes applying learning and forgetting factors to the data in the probabilistic grid-based map. Using the learning and forgetting factors allows the probabilistic grid-based map to represent all obstacles that have been detected by the vehicle sensors over a period of time, including both static and dynamic obstacles. For example, the forgetting factor may reduce the probability of a cell over time and the learning factor may increase the probability of a cell over time.

The obstacle detection system then determines 414 whether an obstacle is present in the zone of interest based on the data in the probabilistic grid-based map. If no obstacle is detected, method 400 continues to receive data 404 from one or more vehicle-mounted sensors.

If an obstacle is detected, the obstacle detection system provides 416 an alert to the driver or automated driving system. The alert may be any type of alert, including an audible alert, visual alert, haptic alert, and the like. The alert may indicate that an obstacle exists in the vehicle's path and may indicate a location of the obstacle. Additionally, the alert may provide instructions for avoiding contact with the obstacle, such as stopping the vehicle, slowing the vehicle, or steering the vehicle. In some implementations, the alert is provided to automated driving/assistance system 102, which controls the vehicle to avoid contacting the obstacle.

In some embodiments, method 400 also detects a distance between the vehicle as well as a speed and a trajectory of the obstacle if it is moving. Based on the distance, speed, and trajectory of the obstacle, the obstacle detection system determines a likelihood of a collision between the vehicle and the obstacle if the vehicle continues on its current path. If a collision is likely, an alert or other warning is generated and provided to the driver or automated driving system, as discussed above.

In a particular example, a vehicle includes an ultrasonic sensor and a camera. The data from the ultrasonic sensor and the camera is fused to create and update the probabilistic grid-based map.

Although specific examples discussed herein are associated with a vehicle backing up (or reversing), similar systems and methods can be used to detect obstacles in a zone of interest located anywhere near a vehicle and at any point around the perimeter of the vehicle.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving, by a controller of a vehicle, data from at least one sensor mounted to the vehicle;
   creating, by an obstacle detection system executed by the controller, a probabilistic grid-based map associated with an area near the vehicle, the grid-based map defined as a two-dimensional array of cells distributed in a horizontal plane adjacent the vehicle;
   determining, by the obstacle detection system, a confidence associated with each cell of the array of cells in the probabilistic grid-based map; and
   determining, by the obstacle detection system, a likelihood that an obstacle exists in the area near the vehicle based on the probabilistic grid-based map;
   performing temporal analysis of the received data using learning and forgetting factors associated with the probabilistic grid-based map;
   wherein the learning factor increases a probability value associated with each cell in the array of cells over time; and
   wherein the forgetting factor decreases a probability value associated with each cell in the array of cells over time.

2. The method of claim 1, wherein the at least one sensor includes at least one of a LIDAR sensor, a radar sensor, and a camera.

3. The method of claim 1, further comprising, responsive to determining a likelihood that an obstacle exists in the area near the vehicle, generating an alert to the driver of the vehicle.

4. The method of claim 1, further comprising, responsive to determining a likelihood that an obstacle exists in the area near the vehicle, communicating an alert to an automated driving system of the vehicle.

5. The method of claim 1, further comprising calculating probabilities associated with neighboring cells in the probabilistic grid-based map based on the received data.

6. The method of claim 5, wherein the neighboring cells include eight cells immediately surrounding a particular cell in the probabilistic grid-based map.

7. The method of claim 5, further comprising updating probabilistic values of the neighboring cells using a Bayesian method.

8. The method of claim 1, wherein the vehicle is an autonomous vehicle.

* * * * *